US012804261B2

(12) United States Patent
Hirai et al.

(10) Patent No.: US 12,804,261 B2
(45) Date of Patent: Nov. 17, 2026

(54) CONTROL DEVICE, CONTROL METHOD, INFORMATION PROCESSING DEVICE, GENERATION METHOD, AND PROGRAM

(71) Applicant: Sony Group Corporation, Tokyo (JP)

(72) Inventors: Yuma Hirai, Tokyo (JP); Genki Okada, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 260 days.

(21) Appl. No.: 18/710,629

(22) PCT Filed: Nov. 25, 2022

(86) PCT No.: PCT/JP2022/043457
§ 371 (c)(1),
(2) Date: Nov. 14, 2024

(87) PCT Pub. No.: WO2023/106119
PCT Pub. Date: Jun. 15, 2023

(65) Prior Publication Data

US 2025/0330705 A1 Oct. 23, 2025

(30) Foreign Application Priority Data

Dec. 9, 2021 (JP) ................................ 2021-200039

(51) Int. Cl.
*H04N 23/67* (2023.01)
*G06T 7/50* (2017.01)

(52) U.S. Cl.
CPC ............ *H04N 23/672* (2023.01); *G06T 7/50* (2017.01); *G06T 2207/10028* (2013.01); *G06T 2207/20081* (2013.01); *G06T 2207/20084* (2013.01)

(58) Field of Classification Search
CPC ................ H04N 5/2226; H04N 23/671; G06T 7/50–596
(Continued)

(56) References Cited

U.S. PATENT DOCUMENTS 11,727,591 B2 * 8/2023 Kim .......................... G06T 7/50
2019/0113606 A1 * 4/2019 Mathy .................. G01S 17/894
2021/0073959 A1 3/2021 Elmalem et al.
(Continued)

FOREIGN PATENT DOCUMENTS

CN 112001960 A 11/2020
JP 2019-016275 A 1/2019
(Continued)

OTHER PUBLICATIONS

Heo Minhyeok et al: "Monocular Depth Estimation Using Whole Strip Masking and Reliability-Based Refinement", Oct. 6, 2018 (Oct. 6, 2018), SAT 2015 18th International Conference, Sep. 24-27, 2015; [Lecture Notes in Computer Science; Lect.Notes Computer], pp. 39-55, XP047489224.
(Continued)

*Primary Examiner* — Anthony J Daniels
(74) *Attorney, Agent, or Firm* — XSENSUS LLP

(57) ABSTRACT

The present technology relates to a control device, a control method, an information processing device, a generation method, and a program capable of determining whether or not Depth information of an estimation result is reliable information.

A control device according to one aspect of the present technology generates Depth information indicating a distance to each position of a subject appearing in a captured image on the basis of output of a first estimation model when the captured image is input, and generates reliability information indicating reliability of the Depth information on the basis of output of a second estimation model when inter-
(Continued)

mediate data generated in the first estimation model is input at the time of estimating the Depth information. The present technology can be applied to a device including a camera.

14 Claims, 13 Drawing Sheets

(58) Field of Classification Search
USPC .......................................................... 348/345
See application file for complete search history.

(56) References Cited

U.S. PATENT DOCUMENTS

| | | | | |
|---|---|---|---|---|
| 2021/0082135 | A1 | 3/2021 | Xu et al. | |
| 2021/0084238 | A1 | 3/2021 | Kashiwagi | |
| 2022/0116544 | A1* | 4/2022 | Gamadia | H04N 23/90 |
| 2022/0130073 | A1* | 4/2022 | Kang | G01S 17/36 |
| 2022/0377209 | A1* | 11/2022 | Katz | H04N 5/2226 |
| 2024/0121511 | A1* | 4/2024 | Xu | H04N 23/958 |

FOREIGN PATENT DOCUMENTS

| | | | | | |
|---|---|---|---|---|---|
| WO | WO-2013162747 | A1 * | 10/2013 | G02B 27/646 |
| WO | 2019/073814 | A1 | 4/2019 | |

OTHER PUBLICATIONS

Popovic Marija et al: "Volumetric Occupancy Mapping With Probabilistic Depth Completion for Robotic Navigation", IEEE Robotics and Automation Letters, IEEE, Mar. 31, 2021, pp. 5072-5079, vol. 6, No. 3, XP011851215.

Truong Giang Khang et al: "Sequential Depth Completion With Confidence Estimation for 3D Model Reconstruction", IEEE Robotics and Automation Letters, IEEE, Dec. 8, 2020, pp. 327-334, vol. 6, No. 2, XP011828767.

International Search Report and Written Opinion mailed on Jan. 24, 2023, received for PCT Application PCT/JP2022/043457, filed on Nov. 25, 2022, 8 pages including English Translation.

* cited by examiner

CONTROL DEVICE, CONTROL METHOD, INFORMATION PROCESSING DEVICE, GENERATION METHOD, AND PROGRAM

TECHNICAL FIELD

The present technology relates to a control device, a control method, an information processing device, a generation method, and a program, and more particularly, to a control device, a control method, an information processing device, a generation method, and a program capable of determining whether or not Depth information of an estimation result is reliable information.

BACKGROUND ART

Various technologies for using an estimation model generated by machine learning for imaging control in a camera or the like have been proposed.

For example, Patent Document 1 discloses a technology of controlling autofocus using a neural network where a waveform of a phase difference detected in a phase difference detection pixel is input and a defocus amount such as an image shift amount is output.

CITATION LIST

Patent Document

Patent Document 1: WO 2019/073814 A

SUMMARY OF THE INVENTION

Problems to be Solved by the Invention

Whether or not an estimation result of an estimation model is suitable for a situation during imaging depends on learning data used for learning.

Normally, in a case where learning using a large amount of learning data representing a situation close to the situation during imaging is performed, the estimation result at the time of photographing is often a result suitable for the situation at the time of photographing. On the contrary, in a case where learning using such learning data is not performed, the estimation result at the time of imaging is often not a result suitable for the situation during imaging.

In a case where the estimation result that is not suitable for a situation during imaging is used, accuracy of imaging control such as autofocus is deteriorated.

The present technology has been made in view of such a situation, and makes it possible to determine whether or not the Depth information of the estimation result is reliable information.

Solutions to Problems

A control device according to one aspect of the present technology includes: a first generation unit that generates Depth information indicating a distance to each position of a subject appearing in a captured image on the basis of output of a first estimation model when the captured image is input; and a second generation unit that generates reliability information indicating reliability of the Depth information on the basis of output of a second estimation model when intermediate data generated in the first estimation model is input at the time of estimation of the Depth information.

An information processing device according to another aspect of the present technology includes: a first learning unit that performs learning using an image for learning and correct answer Depth information indicating a correct answer distance to each position of a subject appearing in the image for learning, and generates a first estimation model having a captured image as input and having, as output, Depth information indicating a distance to each position of the subject appearing in the captured image; and a second learning unit that performs learning using reliability of a correct answer of an estimation result of the first estimation model indicated by a comparison result between the correct answer Depth information and the Depth information and the image for learning used as input of the first estimation model, and generates a second estimation model having, as input, intermediate data generated in the first estimation model at the time of estimation of the Depth information and having the reliability as output.

In one aspect of the present technology, Depth information indicating a distance to each position of a subject appearing in a captured image is generated on the basis of output of a first estimation model when the captured image is input, and reliability information indicating reliability of the Depth information is generated on the basis of output of a second estimation model when intermediate data generated in the first estimation model is input at the time of estimating the Depth information.

In another aspect of the present technology, learning is performed using an image for learning and correct answer Depth information indicating a correct answer distance to each position of a subject appearing in the image for learning, and a first estimation model having a captured image as input and having, as output, Depth information indicating a distance to each position of the subject appearing in the captured image is generated. Furthermore, learning is performed using reliability of a correct answer of an estimation result of the first estimation model represented by a comparison result between the correct answer Depth information and the Depth information and the image for learning used as the input of the first estimation model, and a second estimation model having, as input, intermediate data generated in the first estimation model at the time of estimating the Depth information and the reliability as output is generated.

MODE FOR CARRYING OUT THE INVENTION

Hereinafter, a mode for carrying out the present technology will be described. The description will be given in the following order.

1. Estimation using a Depth estimation model and a reliability estimation model
2. Learning of a Depth estimation model and a reliability estimation model
3. Configuration and operation of a smartphone
4. Configuration and operation of an information processing device (learning device)
5. Modifications <Estimation Using a Depth Estimation Model and a Reliability Estimation Model>

Figure 1:
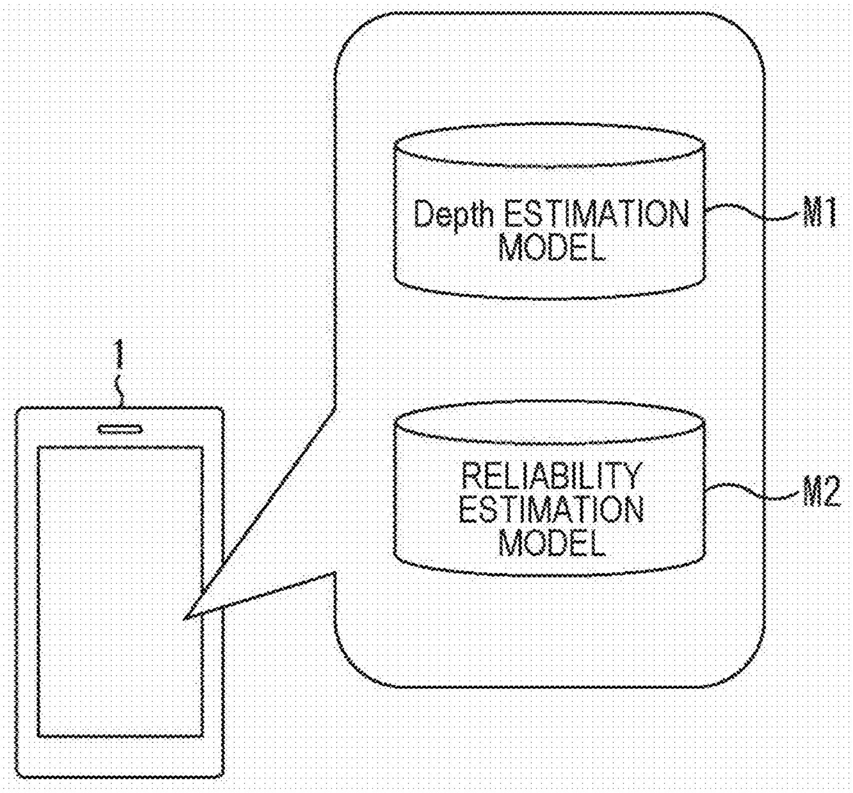
FIG. 1 is a diagram illustrating an example of an estimation model prepared in a smartphone according to an embodiment of the present technology.

FIG. 1 is a diagram illustrating an example of an estimation model prepared in a smartphone according to an embodiment of the present technology.

As illustrated in a balloon of FIG. 1, two estimation (inference) models of a Depth estimation model M1 and a reliability estimation model M2 are prepared in a smartphone 1 according to an embodiment of the present technology. The Depth estimation model M1 and the reliability estimation model M2 are configured by a neural network or the like generated by machine learning such as deep learning.

The Depth estimation model M1 is an estimation model having an RGB image as input and having, as output, a Depth image representing a distance to each position of a subject appearing in the RGB image.

The reliability estimation model M2 is an estimation model that receives intermediate data generated in the Depth estimation model M1 at the time of estimating the Depth image and outputs the reliability of the estimation result of the Depth estimation model M1.

A smartphone 1 is a mobile terminal having an imaging function. In the smartphone 1, whether or not to use the estimation result of the Depth estimation model M1 for various types of control regarding imaging such as autofocus is determined on the basis of the reliability that is an estimation result of the reliability estimation model M2.

Figure 2:
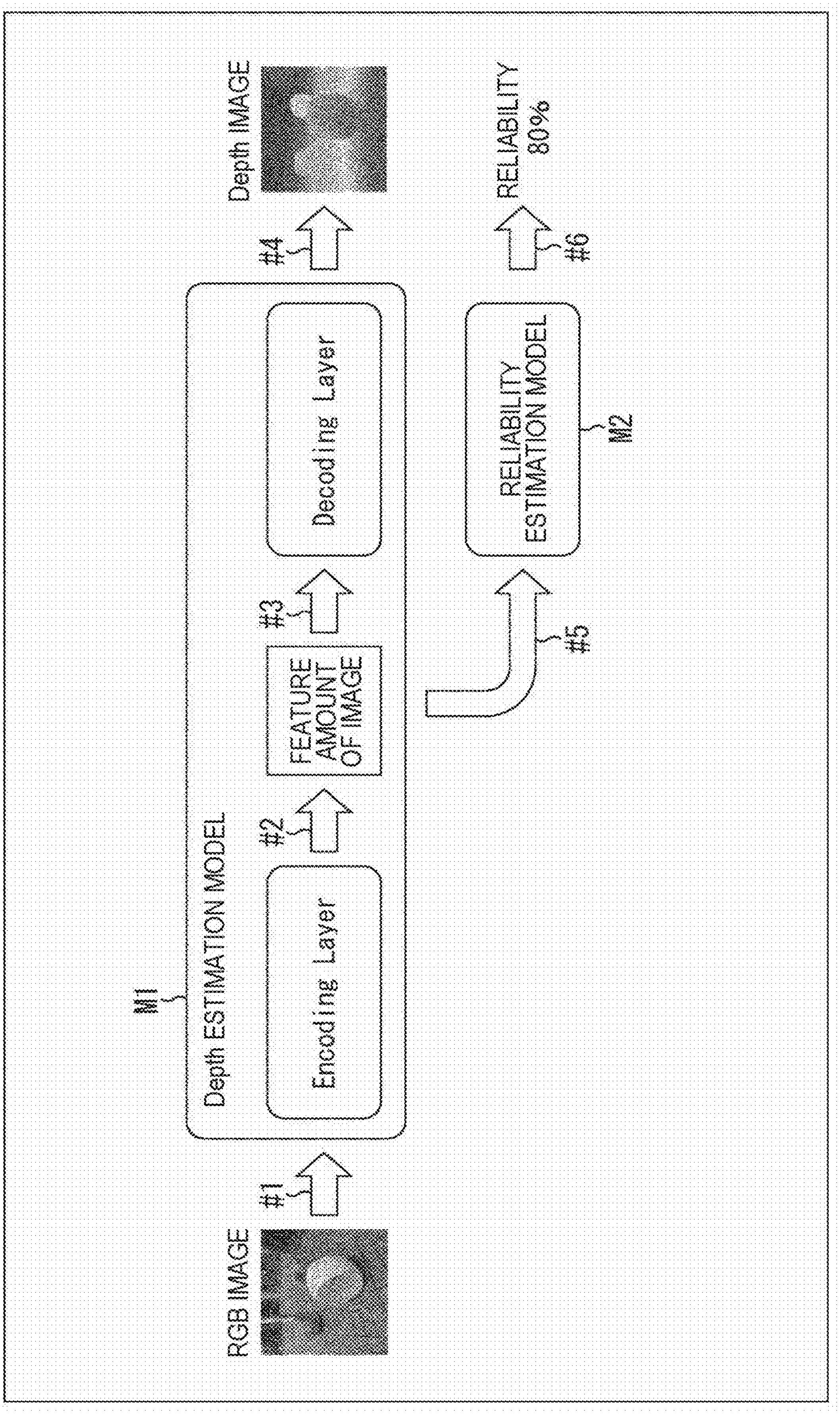
FIG. 2 is a diagram illustrating a flow of estimation using a Depth estimation model and a reliability estimation model.

FIG. 2 is a diagram illustrating a flow of estimation using the Depth estimation model M1 and the reliability estimation model M2.

As illustrated in FIG. 2, the Depth estimation model M1 includes an encoding layer including an input layer, and a decoding layer including an output layer. For example, an image of one frame for preview captured before capturing an image to be saved as a still image is input to the Depth estimation model M1 as an RGB image as indicated by an arrow #1. As described above, the Depth estimation model M1 is an estimation model that performs estimation using a monocular image as input.

In the encoding layer of the Depth estimation model M1, processing such as convolution, as image analysis processing, is performed, and intermediate data is generated as indicated by an arrow #2. The intermediate data generated by the encoding layer is data of the feature amount of the RGB image used for input. Data of a feature amount of the RGB image is input to the decoding layer as indicated by an arrow #3.

In the decoding layer, various types of processing serving as restoration processing are performed, and a Depth image is output as indicated by an arrow #4. The Depth image is an image in which a distance to a subject at a position corresponding to each pixel of the Depth image is a value of each pixel. In FIG. 2, shading on the Depth image indicates a difference in distance to a subject at a position corresponding to each pixel.

On the basis of the Depth image obtained as an estimation result of the Depth estimation model M1, it is possible to specify the distance to the subject appearing in the RGB image used for the input. Furthermore, it is possible to determine a subject to be focused or to focus on the subject to be focused, on the basis of the distance to the subject.

On the other hand, the feature amount data of the RGB image generated as the intermediate data of the Depth estimation model M1 is input to the reliability estimation model M2 as indicated by an arrow #5. In the reliability estimation model M2, estimation is performed using the data of the feature amount of the RGB image as input, and reliability such as 80% is output as indicated by an arrow #6. The reliability output by the reliability estimation model M2 represents a degree of reliability of the Depth image which is an estimation result of the Depth estimation model M1.

For example, higher reliability represents higher (more reliable) accuracy of the distance indicated by the Depth image which is an estimation result of the Depth estimation model M1. The RGB image used for the input of the estimation of the Depth image with high reliability can be said to be a good image for the Depth estimation model M1. That is, by using the reliability estimation model M2, it is possible to determine whether or not the RGB image input to the Depth estimation model M1 is a good image for the Depth estimation model M1.

Usually, whether or not the input data is good data for the estimation model depends on learning data used for learning of an estimation model. In a case where an image having a content close to the content of the RGB image input to the Depth estimation model M1 is frequently used for learning, the RGB image is a good image for the Depth estimation model M1, and as a result, a highly reliable Depth image is obtained as an estimation result.

On the basis of the reliability that is an estimation result of the reliability estimation model M2, it is determined whether or not to use the Depth image that is an estimation result of the Depth estimation model M1 for imaging control such as autofocus. For example, in a case where the reliability is higher than a threshold, the Depth image is used for imaging control, and in a case where the reliability is lower than a threshold, information obtained by another method is used for imaging control.

As described above, the smartphone 1 can determine whether or not to use the Depth image for imaging control depending on the reliability. Furthermore, since the smartphone 1 does not use the Depth image with low reliability, it is possible to accurately control imaging on the basis of the Depth image with high reliability.

<Learning of a Depth Estimation Model and a Reliability Estimation Model>

Figure 3:
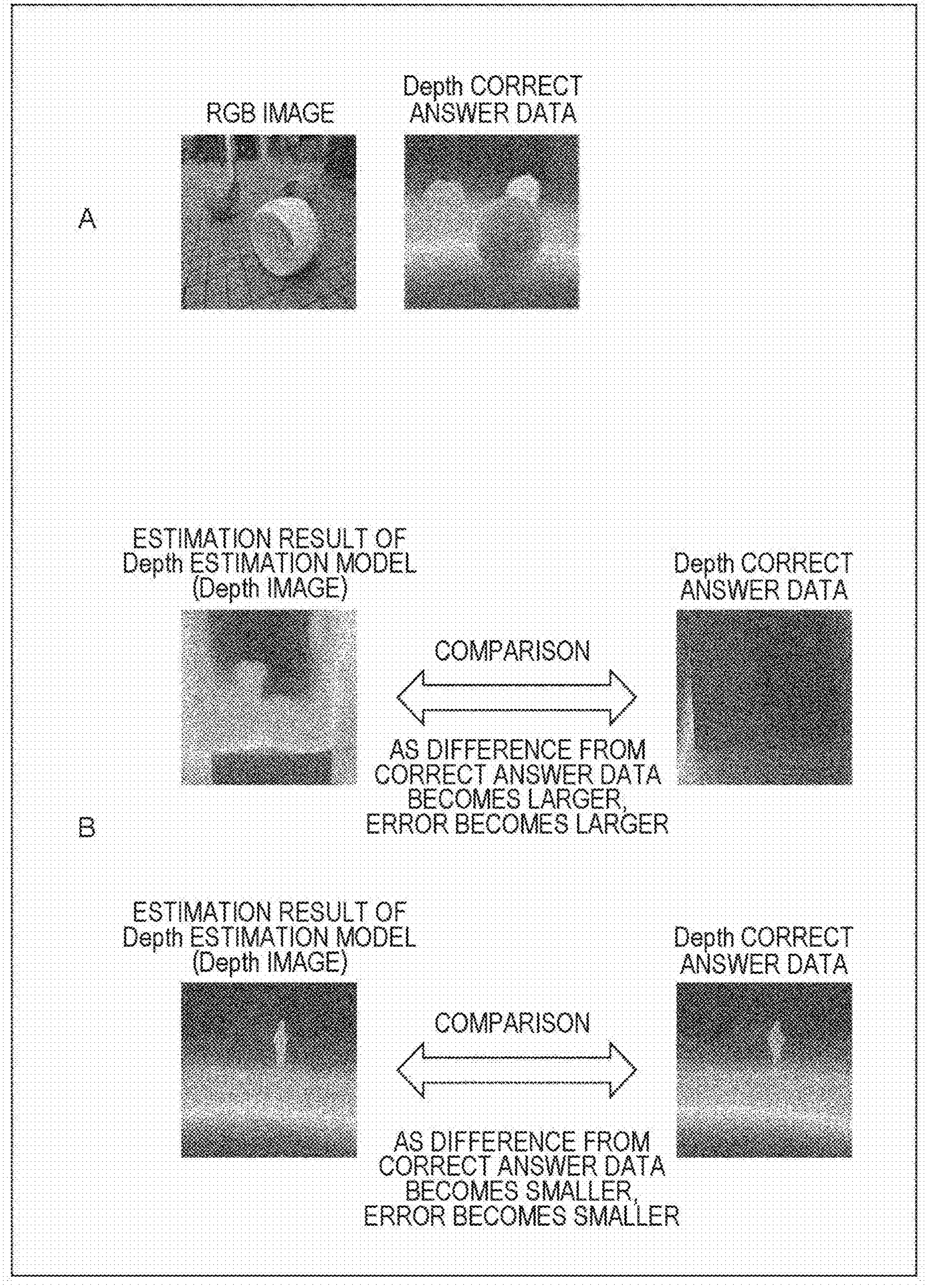
FIG. 3 is a diagram illustrating an example of learning data.

FIG. 3 is a diagram illustrating an example of learning data.

As illustrated in A of FIG. 3, learning of the Depth estimation model M1 is performed by using a pair of an RGB image and Depth correct answer data as learning data. A large number of pairs of RGB images and Depth correct answer data are used for learning of the Depth estimation model M1. The Depth correct answer data is data indicating a correct answer distance to each position of the subject appearing in the paired RGB images.

On the other hand, learning of the reliability estimation model M2 is performed by using a pair of an RGB image and reliability correct answer data as learning data. A large number of pairs of RGB images and reliability correct answer data are used for learning of the reliability estimation model M2. The reliability correct answer data is data indicating the reliability of the correct answer of the Depth image obtained as an estimation result when the paired RGB images are input to the Depth estimation model M1.

As illustrated in B of FIG. 3, the reliability correct answer data constituting the learning data of the reliability estimation model M2 is obtained on the basis of a comparison result between the Depth image obtained as an estimation result when the RGB image is input to the Depth estimation model M1 and the Depth correct answer data. That is, learning of the reliability estimation model M2 is performed after learning of the Depth estimation model M1. The more the difference between the Depth image and the Depth correct answer data, the lower the reliability of the correct answer. The less the difference between the Depth image and the Depth correct answer data, the higher the reliability of the correct answer.

Figure 4:
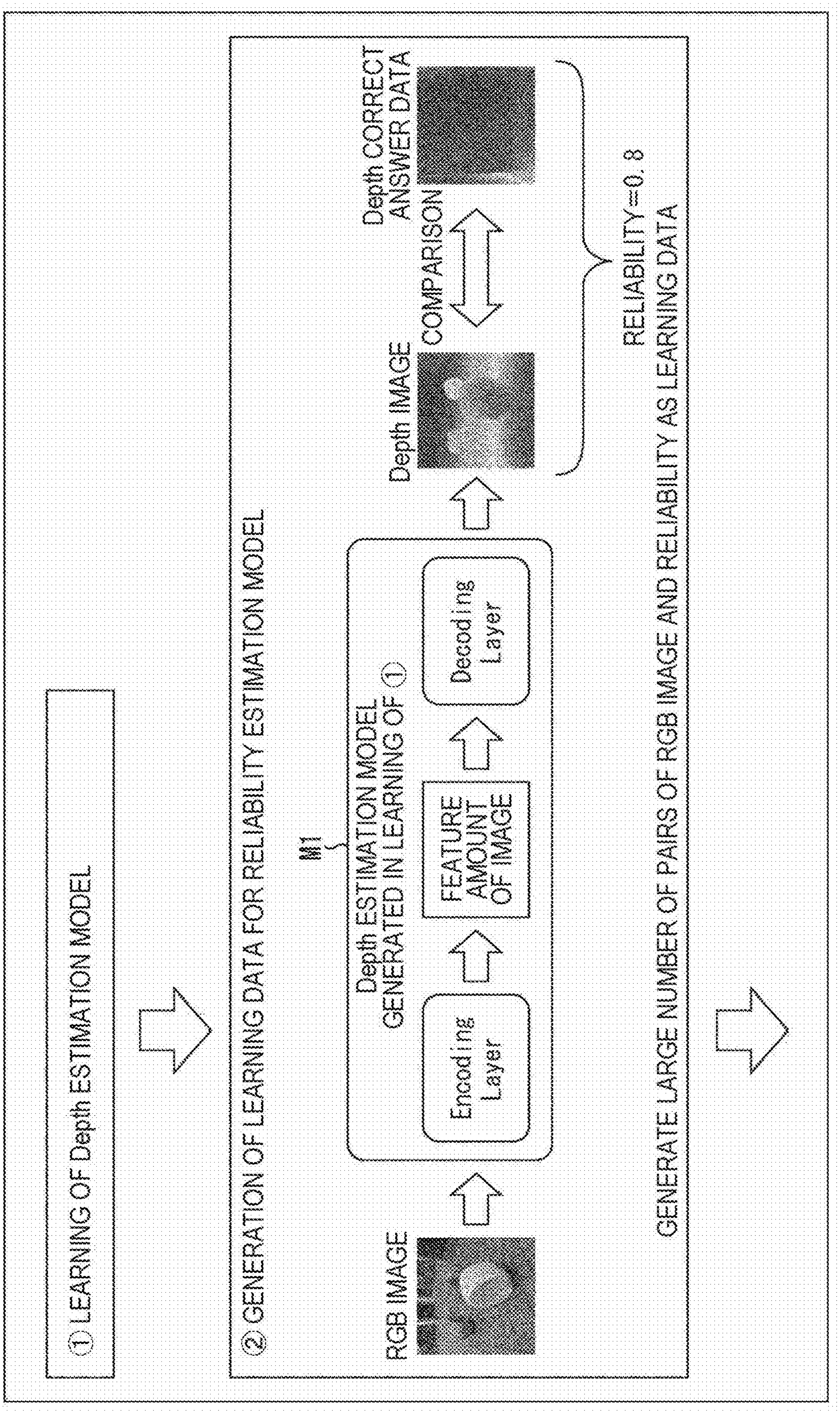
FIG. 4 is a diagram illustrating a flow of learning of a Depth estimation model and a reliability estimation model.
Figure 5:
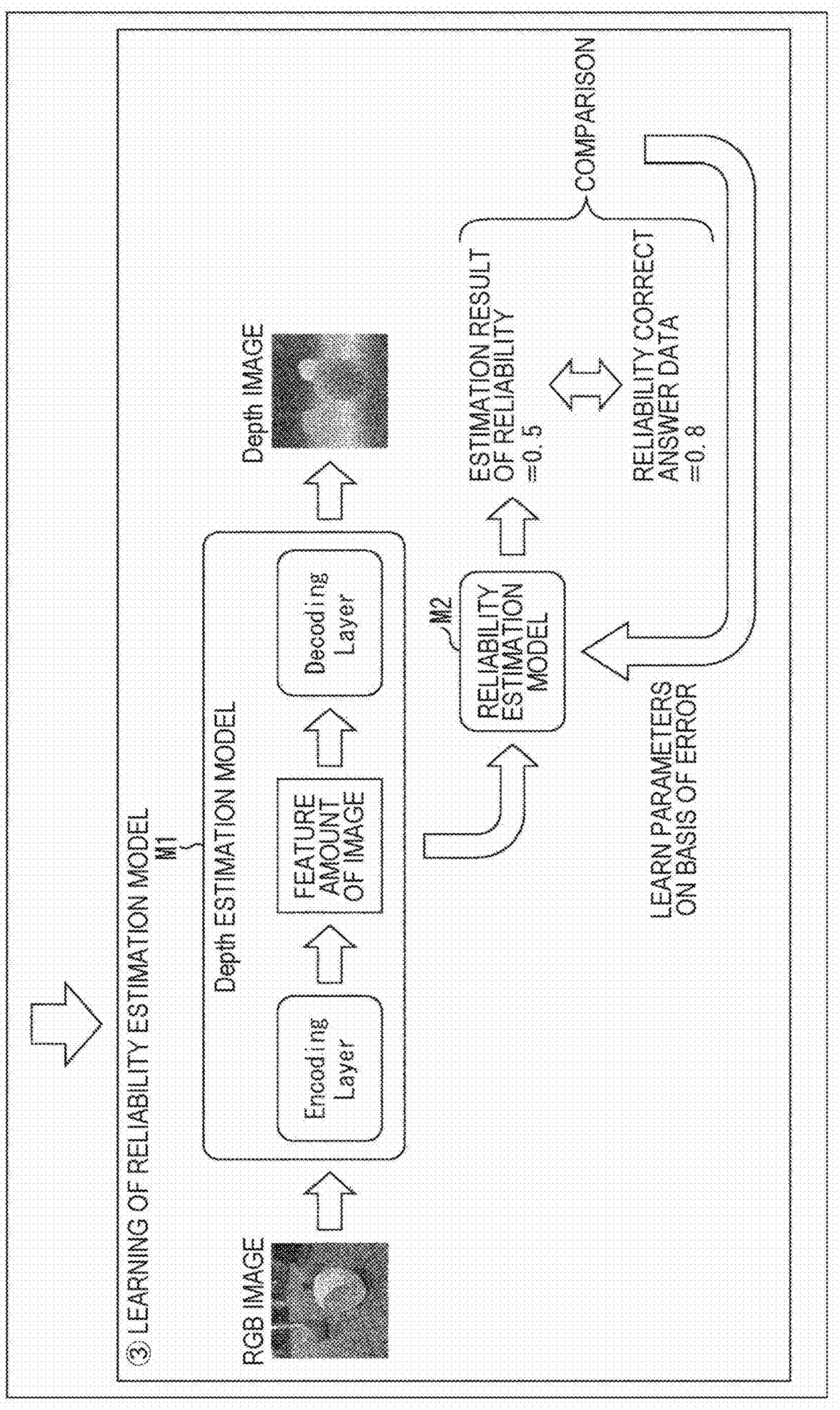
FIG. 5 is a diagram illustrating a flow of learning of a Depth estimation model and a reliability estimation model.

FIGS. 4 and 5 are diagrams illustrating a flow of learning of the Depth estimation model M1 and the reliability estimation model M2.

As illustrated in the upper part of FIG. 4, learning of the Depth estimation model M1 is performed using learning data for the Depth estimation model M1. Learning of the Depth estimation model M1 is performed, for example, by adjusting parameters of each layer of the Depth estimation model M1 on the basis of an error between a Depth image obtained as an estimation result when RGB images constituting learning data are input to the Depth estimation model M1 and Depth correct answer data.

After the Depth estimation model M1 is generated, learning data for the reliability estimation model M2 is generated as illustrated in the lower part of FIG. 4. The generation of the learning data for the reliability estimation model M2 is performed by repeatedly obtaining reliability correct answer data on the basis of a comparison result between the Depth image obtained as an estimation result when the RGB image constituting the learning data is input to the Depth estimation model M1 and the Depth correct answer data, and generating a pair of the reliability correct answer data and the RGB image input to the Depth estimation model M1. A large number of pairs of RGB images and reliability correct answer data are generated as learning data for the reliability estimation model M2.

After the learning data for the reliability estimation model M2 is generated, learning data for the reliability estimation model M2 is learned as illustrated in FIG. 5. Learning of the reliability estimation model M2 is performed such that intermediate data generated in the Depth estimation model M1 when an RGB image constituting learning data is input to the Depth estimation model M1 to estimate a Depth image is input to the reliability estimation model M2, and parameters of each layer of the reliability estimation model M2 are adjusted on the basis of an error between reliability obtained as an estimation result of the reliability estimation model M2 and reliability correct answer data.

The above learning is performed in an information processing device such as a PC. The Depth estimation model M1 and the reliability estimation model M2 generated by the information processing device are provided to the smartphone 1 and used for imaging control.

<Configuration and Operation of Smartphone>

Configuration of Smartphone

Figure 6:
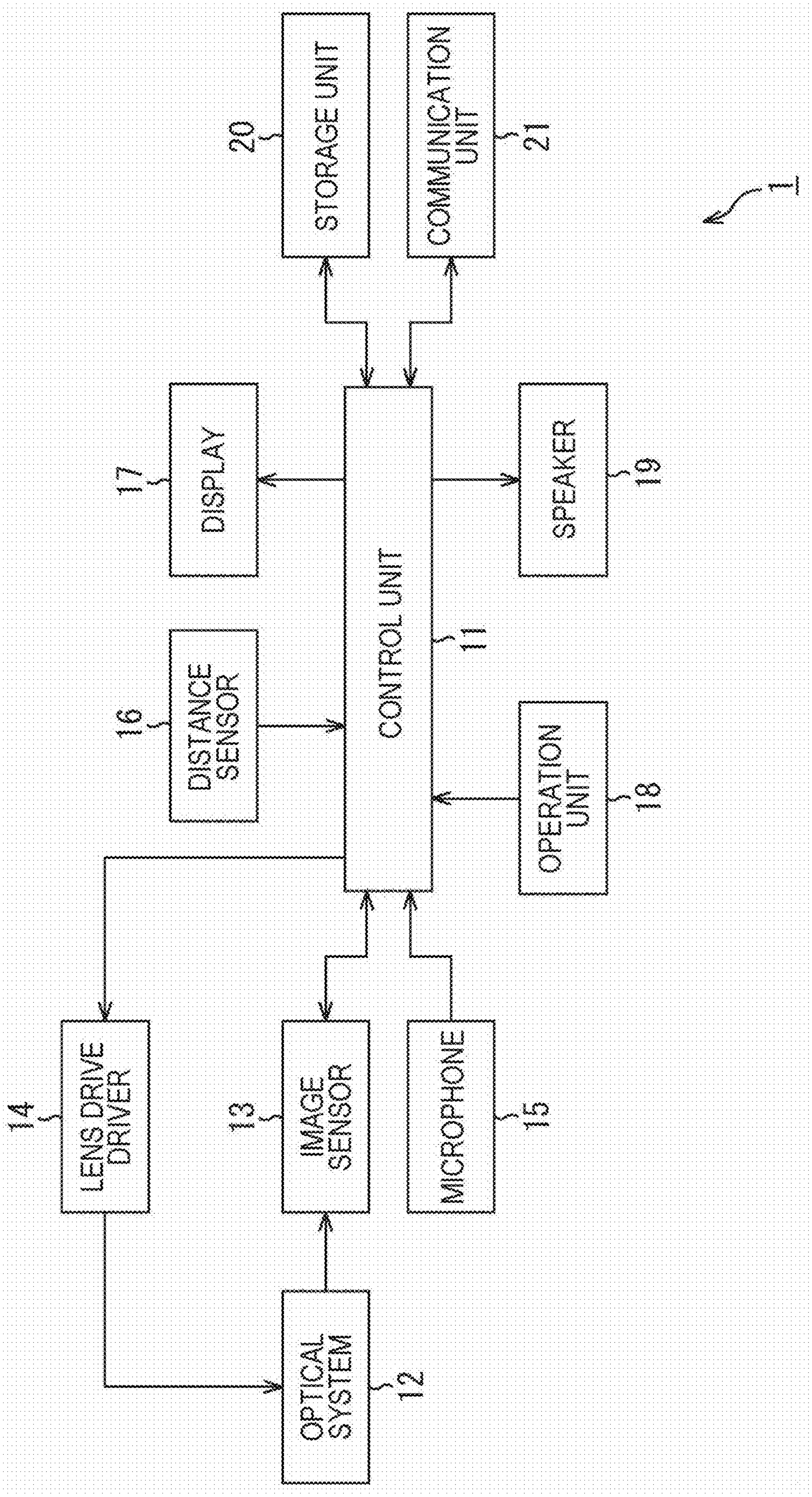
FIG. 6 is a block diagram illustrating a hardware configuration example of a smartphone.

FIG. 6 is a block diagram illustrating a hardware configuration example of a smartphone 1.

The smartphone 1 includes a control unit 11, an optical system 12, an image sensor 13, a lens drive driver 14, a microphone 15, a distance sensor 16, a display 17, an operation unit 18, a speaker 19, a storage unit 20, and a communication unit 21.

The control unit 11 includes a central processing unit (CPU), a read only memory (ROM), a random access memory (RAM), and the like. The control unit 11 executes a predetermined program and controls the entire operation of the smartphone 1.

The optical system 12 includes an imaging lens for condensing light from a subject on the image sensor 13, a drive mechanism for moving the imaging lens to perform focusing and zooming, a shutter mechanism, an iris mechanism, and the like. Each mechanism is driven according to control by the lens drive driver 14. Light from the subject reaches the image sensor 13 as an imaging device via the optical system 12.

The image sensor 13 photoelectrically converts light from the subject and outputs RGB image data. Image data output from the image sensor 13 is output to the control unit 11. As the image sensor 13, a charge coupled device (CCD) image sensor or a complementary metal oxide semiconductor (CMOS) image sensor are used.

The lens drive driver 14 controls operations of a driving mechanism, a shutter mechanism, an iris mechanism, and the like of the optical system 12 according to control by the control unit 11. Under the control of the lens drive driver 14, adjustment of an exposure time (shutter speed), adjustment of an aperture value (F value), and the like are performed.

The microphone 15 outputs audio data such as collected sound to the control unit 11.

The distance sensor 16 includes a sensor such as a ToF sensor that measures the distance of the subject. Sensor data indicating a measurement result by the distance sensor 16 is supplied to the control unit 11.

The display 17 includes an LCD or the like. The display 17 displays various types of information such as a menu screen or an image during image capture under the control of the control unit 11.

The operation unit 18 includes an operation button, a touch panel, and the like provided on a surface of a housing of the smartphone 1. The operation unit 18 outputs information indicating the content of an operation by the user to the control unit 11.

The speaker 19 outputs sound on the basis of an audio signal supplied from the control unit 11.

The storage unit 20 includes a flash memory, or a memory card inserted in a card slot provided in the housing. The storage unit 20 stores various types of data such as image data supplied from the control unit 11.

The communication unit 21 performs wireless or wired communication with an external device. The communication unit 21 transmits, to an external PC or a server on the Internet, various types of data such as image data supplied from the control unit 11.

Figure 7:
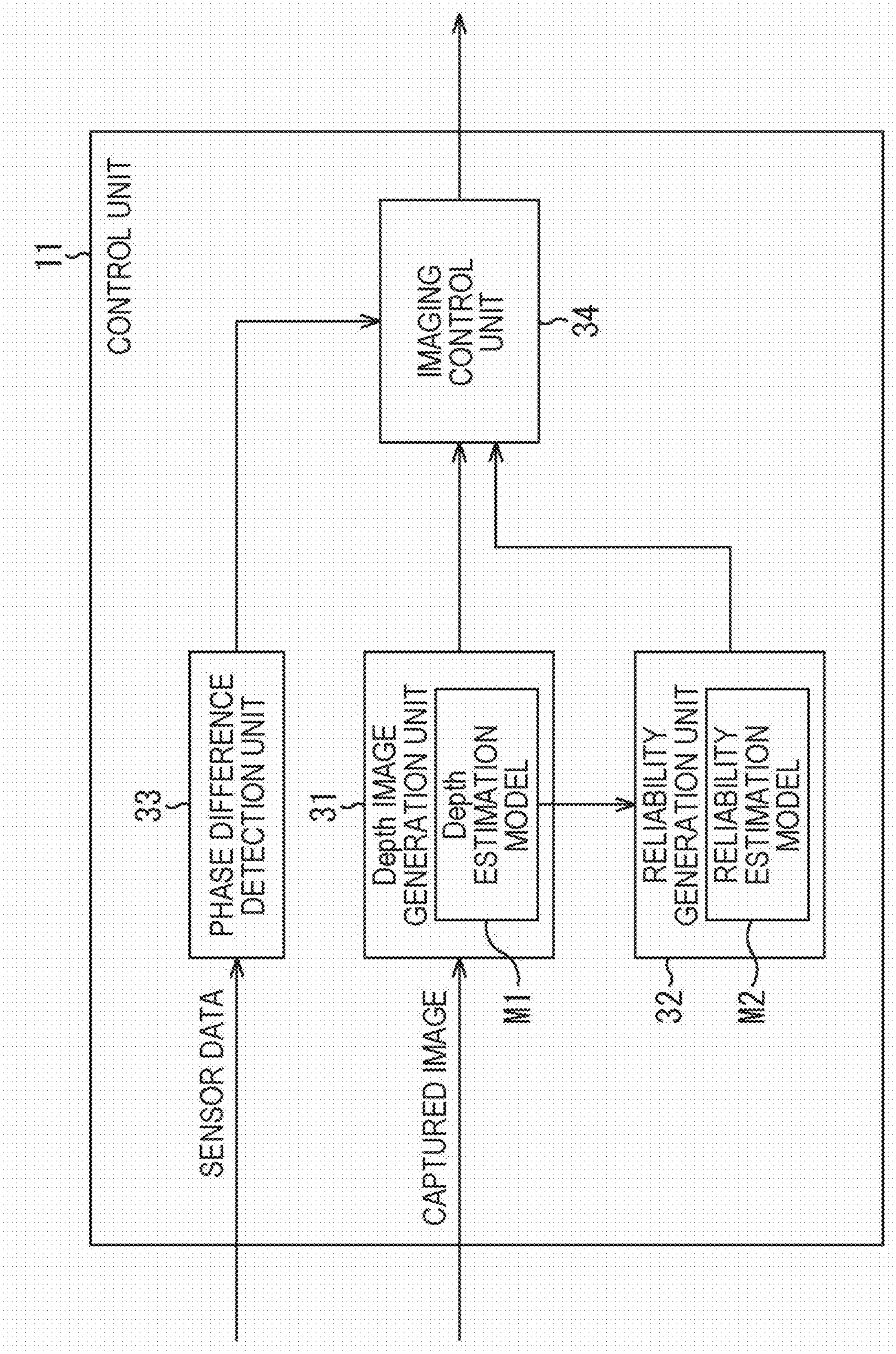
FIG. 7 is a block diagram illustrating a functional configuration example of a control unit.

FIG. 7 is a block diagram illustrating a functional configuration example of the control unit 11.

As illustrated in FIG. 7, the control unit 11 includes a Depth image generation unit 31, a reliability generation unit 32, a phase difference detection unit 33, and an imaging control unit 34. A Depth estimation model M1 is prepared in the Depth image generation unit 31, and a reliability estimation model M2 is prepared in the reliability generation unit 32. At least a part of the configuration illustrated in FIG. 7 is implemented by executing a predetermined program by the CPU constituting the control unit 11.

In a case where a program such as a camera application using an imaging function is activated, data of a captured image output by the image sensor 13 is input to the Depth image generation unit 31. Furthermore, a detection result of phase difference detection pixels provided on a captured image surface of the image sensor 13 together with captured image pixels is input to the phase difference detection unit 33 as sensor data. In this example, the image sensor 13 is a sensor having a function of imaging surface phase difference detection. The detection of the phase difference may be performed not in the pixels of the image sensor 13 but in a sensor dedicated to the phase difference detection.

The Depth image generation unit 31 inputs a captured image, which is an RGB image, to the Depth estimation model M1, and acquires a Depth image that is an estimation result of the Depth estimation model M1. The Depth image generation unit 31 outputs a Depth image, which is Depth information generated on the basis of the output of the Depth estimation model M1, to the imaging control unit 34, and outputs, to the reliability generation unit 32, intermediate data generated in the Depth estimation model M1 at the time of estimation of the Depth image. As described above, the Depth image generation unit 31 functions as a generation unit that generates Depth information on the basis of the output of the Depth estimation model M1 when a captured image which is an RGB image is input.

The reliability generation unit 32 inputs the data of the feature amount of the RGB image, which is the intermediate data supplied from the Depth image generation unit 31, to the reliability estimation model M2, and acquires the reliability of the estimation result of the Depth estimation model M1. The reliability generation unit 32 outputs information indicating the reliability of the estimation result of the Depth estimation model M1 to the imaging control unit 34. As described above, the reliability generation unit 32 functions as a generation unit that generates reliability information indicating the reliability of the estimation result of the Depth estimation model M1 on the basis of the output of the reliability estimation model M2 when the data of the feature amount of the RGB image, which is the intermediate data, is input.

The phase difference detection unit 33 detects a phase difference on the basis of the sensor data supplied from the image sensor 13 and outputs a detection result of the phase difference to the imaging control unit 34.

The imaging control unit 34 controls autofocus on the basis of information supplied from the Depth image generation unit 31, the reliability generation unit 32, and the phase difference detection unit 33.

For example, in a case where the reliability of the Depth image is higher than the threshold, the imaging control unit 34 determines a subject to be focused on the basis of the Depth image generated by the Depth image generation unit 31.

The imaging control unit 34 drives the lens drive driver 14 and controls the focus so as to focus on the determined focus target.

Furthermore, in a case where the reliability of the Depth image is lower than the threshold, the imaging control unit 34 determines a subject to be focused on the basis of the phase difference detected by the phase difference detection unit 33. The imaging control unit 34 drives the lens drive driver 14 and controls the focus so as to focus on the determined focus target.

In this manner, the imaging control unit 34 controls imaging by using the Depth image according to the reliability. In addition to autofocus, various types of control related to imaging such as exposure control and white balance control may be performed on the basis of the Depth image and the reliability.

Operation of Smartphone

Figure 8:
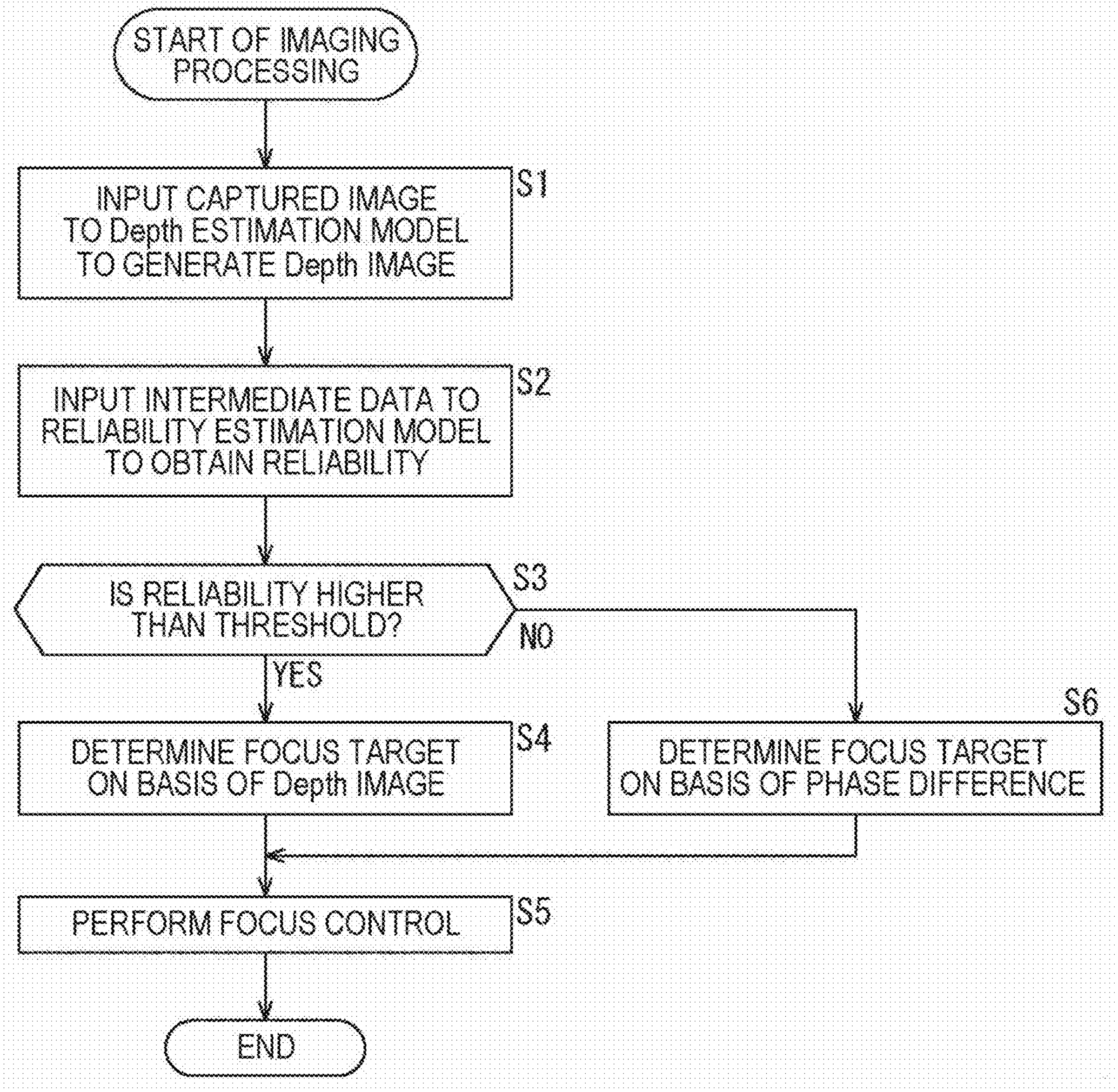
FIG. 8 is a flowchart explaining an imaging processing.

An imaging process of the smartphone 1 having the above-described configuration will be described with reference to a flowchart of FIG. 8.

In step S1, the Depth image generation unit 31 inputs a captured image to the Depth estimation model M1, and generates a Depth image which is an estimation result of the Depth estimation model M1.

In step S2, the reliability generation unit 32 inputs the intermediate data generated at the time of estimating the Depth image to the reliability estimation model M2, and obtains the reliability of the estimation result of the Depth estimation model M1.

In step S3, the imaging control unit 34 determines whether or not the reliability of the Depth image is higher than a threshold.

In a case where it is determined in step S3 that the reliability of the Depth image is higher than the threshold, the imaging control unit 34 determines, in step S4, a subject to be focused on the basis of the Depth image generated by the Depth image generation unit 31.

In step S5, the imaging control unit 34 controls the focus so as to focus on the determined focus target.

On the other hand, in a case where it is determined in step S3 that the reliability of the Depth image is lower than the threshold, the imaging control unit 34 determines, in step S6, a subject to be focused on the basis of the phase difference detected by the phase difference detection unit 33. During imaging, the phase difference detection unit 33 repeatedly detects the phase difference.

After the subject to be focused is determined on the basis of the phase difference, the focus is controlled in step S5 so as to focus on the determined focus subject.

As described above, the smartphone 1 can determine whether or not the estimation result of the Depth estimation model M1 is reliable information on the basis of the estimation result of the reliability estimation model M2. In a case where the information is unreliable information, the information obtained by another method is used for control without using the estimation result of the Depth estimation model M1, whereby the smartphone 1 can perform control such as imaging with higher accuracy.

<Configuration and Operation of Information Processing Device (Learning Device)>

Configuration of Information Processing Device

Figure 9:
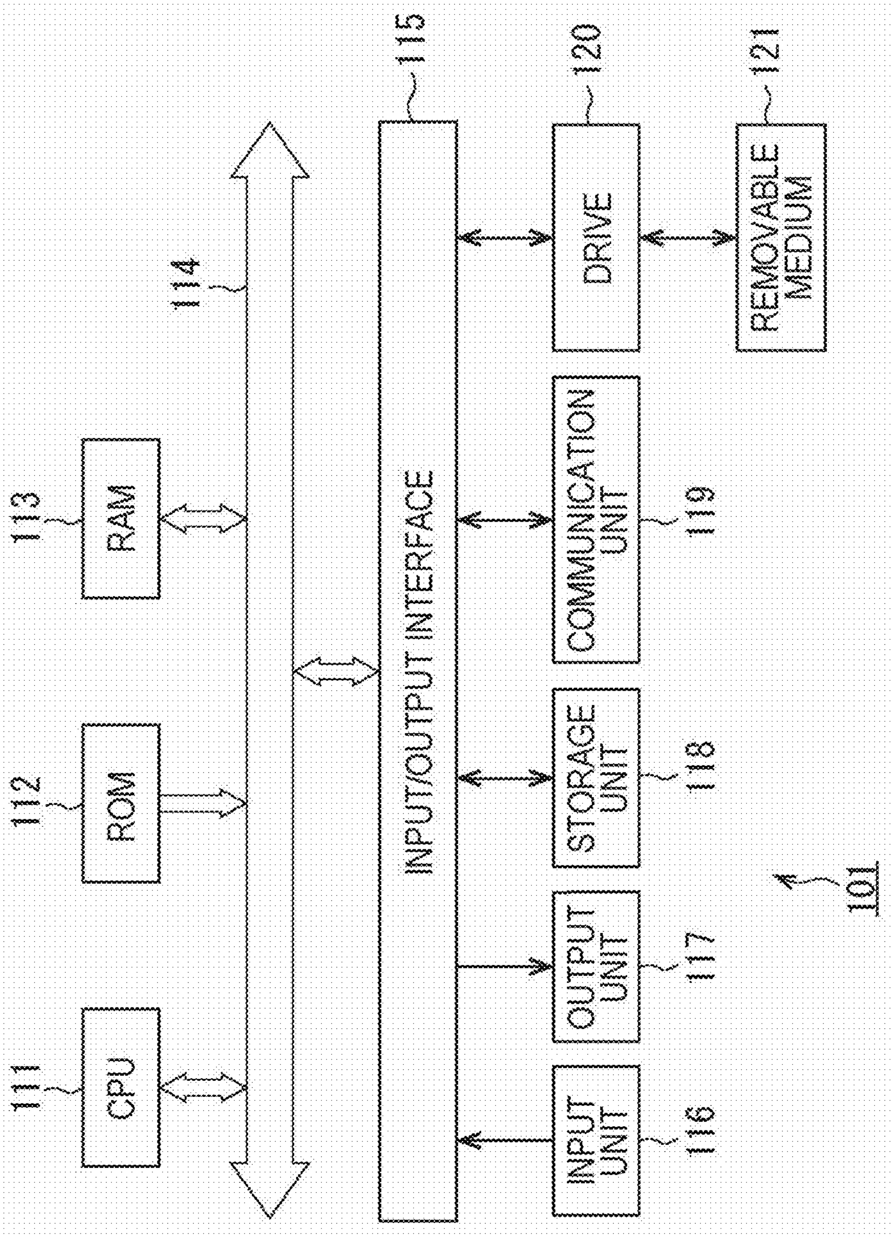
FIG. 9 is a block diagram illustrating a configuration example of an information processing device.

FIG. 9 is a block diagram illustrating a configuration example of an information processing device.

In an information processing device 101 illustrated in FIG. 9, the learning of the Depth estimation model M1 and the reliability estimation model M2 is performed as described with reference to FIGS. 4 and 5. The information processing device 101 is a learning device which learns the Depth estimation model M1 and the reliability estimation model M2.

A central processing unit (CPU) 111, a read only memory (ROM) 112, and a random access memory (RAM) 113 are interconnected by a bus 114.

An input/output interface 115 is further connected to the bus 114. An input unit 116 including a keyboard and a mouse, and an output unit 117 including a display and a speaker are connected to the input/output interface 115.

Furthermore, a storage unit 118 including a hard disk, a nonvolatile memory, or the like, a communication unit 119 including a network interface or the like, and a drive 120 which drives a removable medium 121 are connected to the input/output interface 115.

Figure 10:
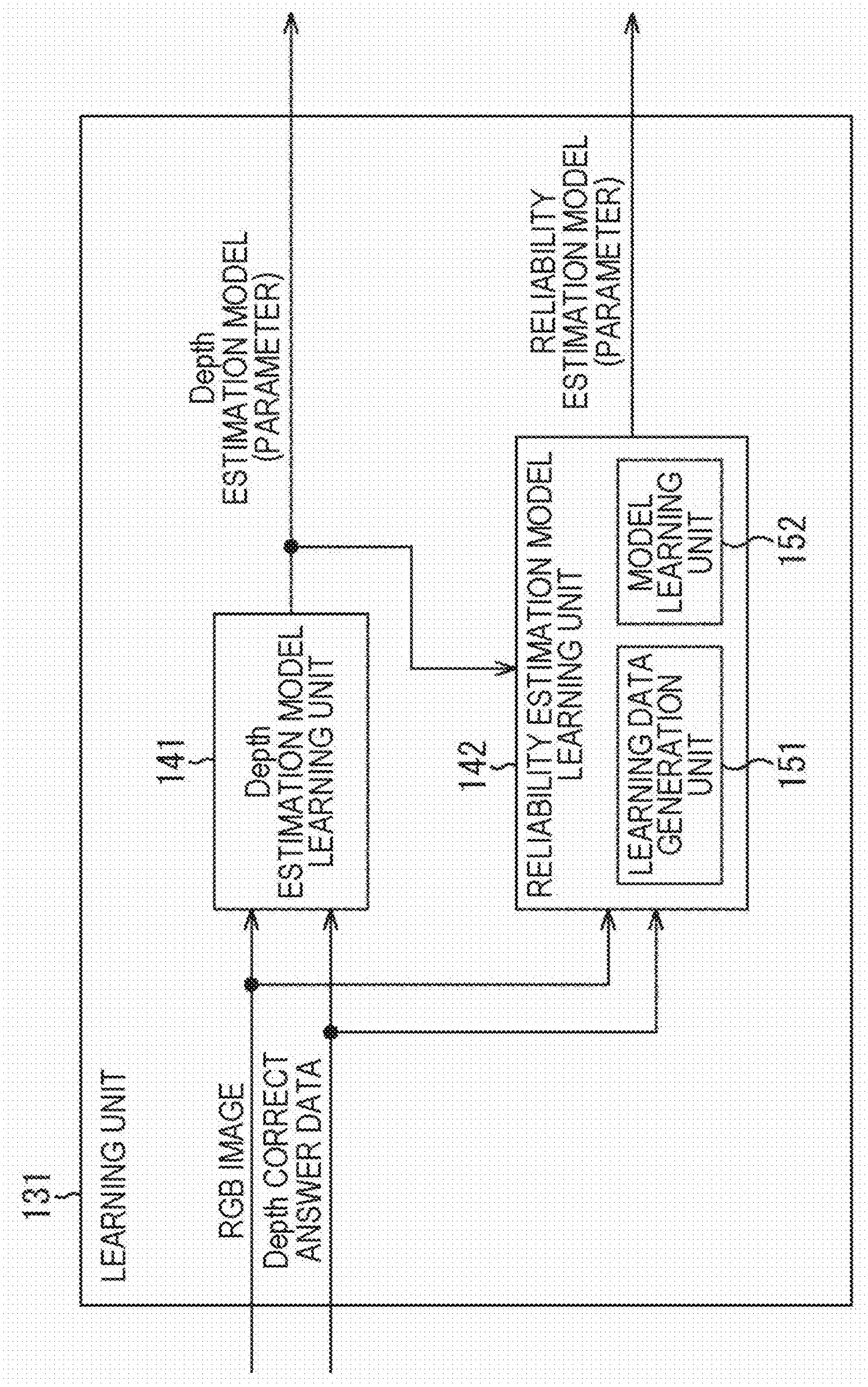
FIG. 10 is a block diagram illustrating a functional configuration example of the information processing device.

FIG. 10 is a block diagram illustrating a functional configuration example of the information processing device 101.

As illustrated in FIG. 10, a learning unit 131 is implemented in the information processing device 101. The learning unit 131 includes a Depth estimation model learning unit 141 and a reliability estimation model learning unit 142. At least a part of the configuration illustrated in FIG. 10 is implemented by executing a predetermined program by the CPU 111 of FIG. 9 constituting the information processing device 101. An RGB image and Depth correct answer data prepared as learning data for the Depth estimation model M1 are input to the learning unit 131.

The Depth estimation model learning unit 141 learns the Depth estimation model M1 by using learning data for the Depth estimation model M1.

As described with reference to FIG. 4, the Depth estimation model learning unit 141 inputs the RGB images constituting the learning data to the Depth estimation model M1 and acquires the estimation result of the Depth image. Furthermore, the Depth estimation model learning unit 141 calculates an error between the Depth image as an estimation result and the Depth correct answer data, and adjusts parameters of each layer of the Depth estimation model M1 on the basis of the calculated error, and thus learns the Depth estimation model M1. Information such as parameters constituting the Depth estimation model M1 generated by the Depth estimation model learning unit 141 is output to the outside and supplied to the reliability estimation model learning unit 142.

The reliability estimation model learning unit 142 includes a learning data generation unit 151 and a model learning unit 152.

The learning data generation unit 151 generates learning data for the reliability estimation model M2. For example, the learning data generation unit 151 inputs the RGB image constituting the learning data to the Depth estimation model M1 generated by the Depth estimation model learning unit 141, and acquires the estimation result of the Depth image. Furthermore, the learning data generation unit 151 compares the Depth image of the estimation result with the Depth correct answer data, and calculates the reliability correct answer data on the basis of the following formulas (1) and (2).

[Mathematical formula 1]

$$MAE = \frac{1}{n}\sum_{i=1}^{n}|a_i - f_i| \quad (1)$$

[Mathematical formula 2]

$$\text{Reliability of correct answer} = 1 - MAE \quad (2)$$

Formula (1) represents that an error of the estimation result of the Depth estimation model M1 with respect to the Depth correct answer data is obtained for each pixel, and an average of absolute values of the error (mean absolute error (MAE)) is calculated. In Formula (1), n represents the number of pixels, and i represents a pixel.

Formula (2) represents that the reliability of the correct answer is calculated by subtracting the average absolute error calculated by Formula (1) from a value of 1. As the error of the estimation result of the Depth estimation model M1 with respect to the Depth correct answer data (the lower the accuracy of the estimation result) is larger, the value of the reliability of the correct answer is smaller, and as the error (the higher the accuracy of the estimation result) is smaller, the value of the reliability of the correct answer is larger.

The learning data generation unit 151 generates learning data for the reliability estimation model M2 by repeatedly generating a pair of reliability correct answer data representing the reliability of the correct answer calculated in this manner and the RGB image input to the Depth estimation model M1. The learning data generated by the learning data generation unit 151 is supplied to the model learning unit 152.

The model learning unit 152 learns the reliability estimation model M2 by using the learning data for the reliability estimation model M2.

As described with reference to FIG. 5, the model learning unit 152 inputs, to the reliability estimation model M2, the intermediate data generated in the Depth estimation model M1 when the RGB image is input to the Depth estimation model M1 to estimate the Depth image, and acquires the estimation result of the reliability. Furthermore, the model learning unit 152 performs learning of the reliability estimation model M2 by calculating an error between the reliability of the estimation result and the reliability of the correct answer represented by the reliability correct answer data and adjusting parameters of each layer of the reliability estimation model M2 on the basis of the calculated error.

Information such as parameters constituting the reliability estimation model M2 generated by the model learning unit 152 is output to the outside and provided to the smartphone 1 together with information of the Depth estimation model M1.

Operation of Information Processing Device

Figure 11:
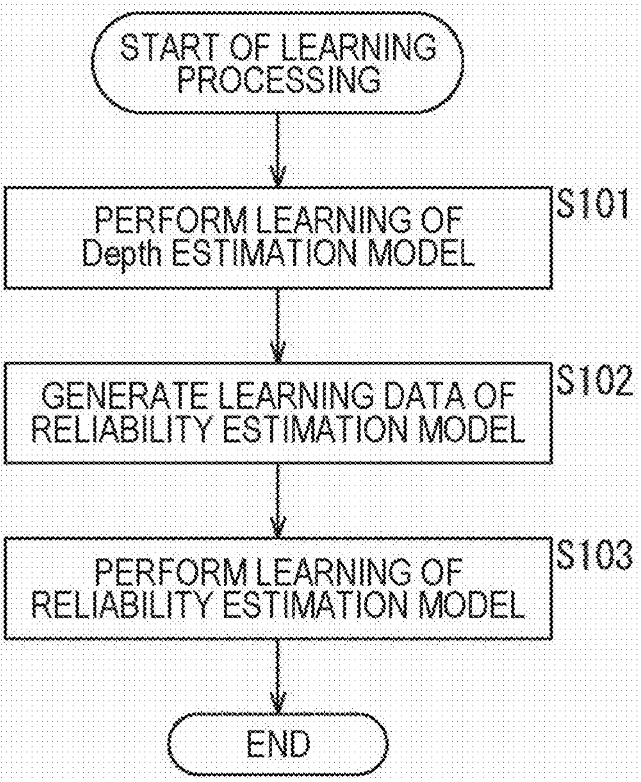
FIG. 11 is a flowchart explaining a learning processing.

With reference to a flowchart of FIG. 11, learning processing of the information processing device 101 will be described.

In step S101, the Depth estimation model learning unit 141 learns the Depth estimation model M1 by using learning data for the Depth estimation model M1.

In step S102, the learning data generation unit 151 of the reliability estimation model learning unit 142 generates the learning data for the reliability estimation model M2 as described above.

In step S103, the model learning unit 152 of the reliability estimation model learning unit 142 learns the reliability estimation model M2 by using the learning data for the reliability estimation model M2. When the learning of the reliability estimation model M2 is completed, a series of learning processing is terminated.

In the above description, the learning of the Depth estimation model M1, the generation of the learning data for the reliability estimation model M2, and the learning of the reliability estimation model M2 are performed by the information processing device 101 that is the same computer. However, any of the above pieces of processing may be performed by a computer different from the information processing device 101. For example, the learning of the Depth estimation model M1 can be performed by a certain computer, and the generation of the learning data for the reliability estimation model M2 and the learning of the reliability estimation model M2 can be performed by another computer.

In this manner, at least one of pieces of processing of the learning of the Depth estimation model M1, the generation of the learning data for the reliability estimation model M2, and the learning of the reliability estimation model M2 can be performed by the information processing device 101, and the other processing can be performed by a computer different from the information processing device 101.

<Modifications>

The distance to each position of the subject appearing in the RGB image is represented by the Depth image, but instead of the image, other forms of information such as information in which values are arranged may be generated as the Depth information.

Example of Reliability Information

A degree of reliability of the estimation result of the Depth estimation model M1 is represented by one value such as 80%, but may be represented using other information.

Figure 12:
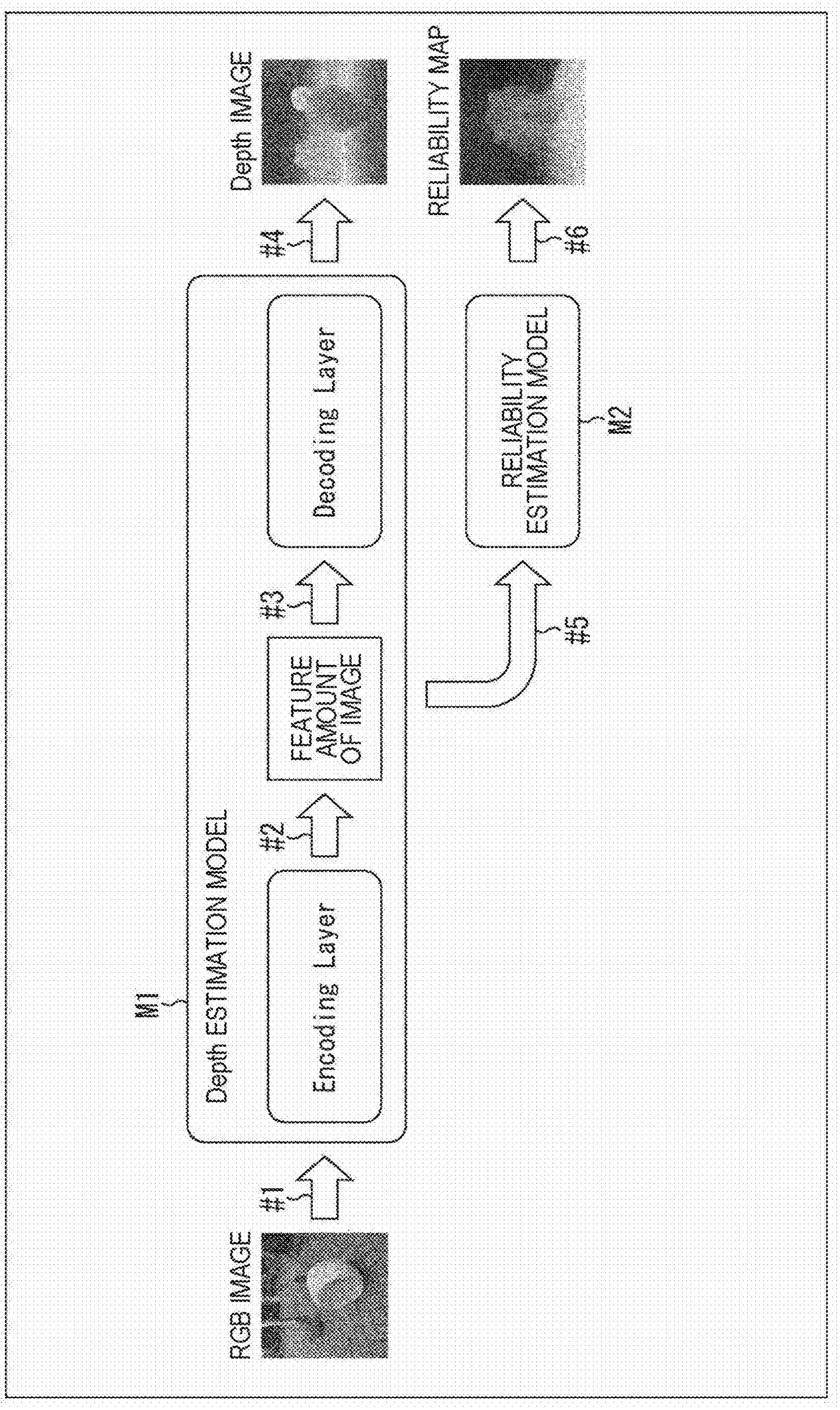
FIG. 12 is a diagram illustrating another flow of estimation.

FIG. 12 is a diagram illustrating another flow of estimation using the Depth estimation model M1 and the reliability estimation model M2. The same contents as those described with reference to FIG. 2 will not be described.

Figure 13:
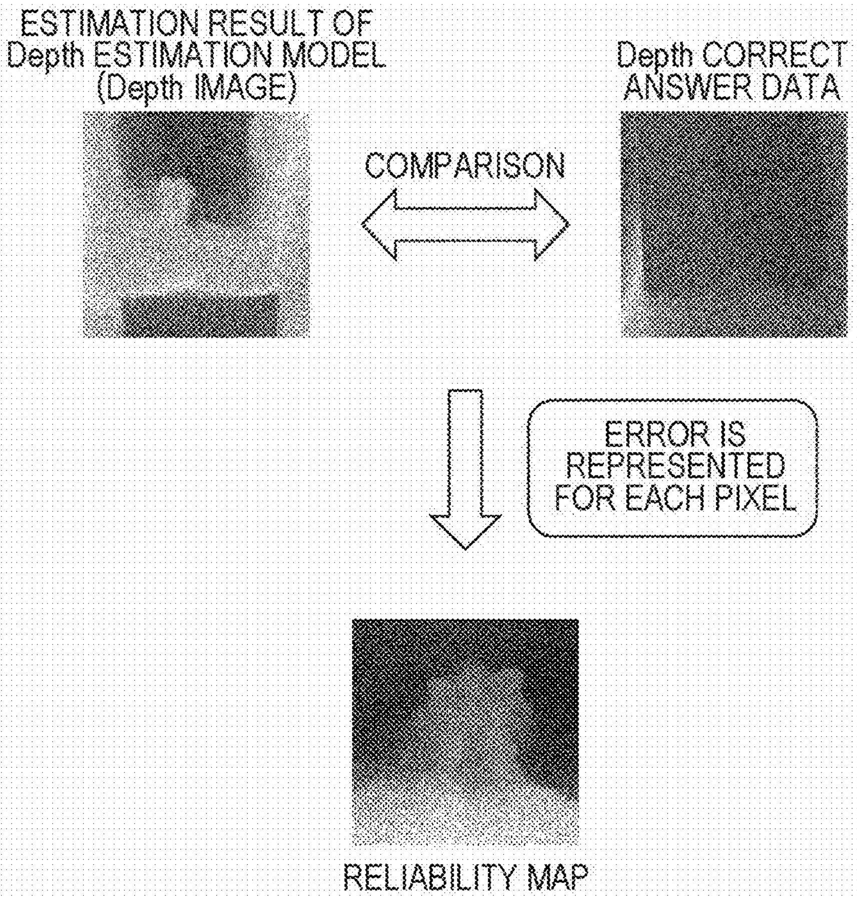
FIG. 13 is a diagram illustrating an example of a reliability map.

In the example of FIG. 12, as indicated by an arrow #6, a reliability map that is map information including a plurality of pixels is generated as an estimation result of the reliability estimation model M2. As illustrated in FIG. 13, the reliability map is information in which an absolute value error for each pixel between the Depth image, the Depth image being an estimation result of the Depth estimation model M1, and the Depth correct answer data is set as a pixel value of each pixel. The pixel value of each pixel of the reliability map represents the reliability of the distance represented by the pixel value of the corresponding pixel of the Depth image.

In this manner, the reliability estimation model M2 may be configured by the estimation model in which the intermediate data generated at the time of estimating the Depth image is input and the reliability map indicating, for each pixel, the degree of reliability of the distance represented by the pixel value of each pixel of the Depth image is output.

On the basis of the reliability map that is an estimation result of the reliability estimation model M2, it is determined whether or not to use the Depth image for imaging control. In a case where the Depth image is used for imaging control, imaging is performed such that in the Depth image, an object appearing in a region of a pixel having high reliability in the reliability map is set as, for example, a focus target.

The reliability map may be used in combination with a result of main subject recognition. In this case, in the smartphone 1, for example, an estimation model having an RGB image as input and a main subject degree map having a main subject degree indicating likeness of the main subject as a pixel value of each pixel as output is prepared.

The imaging control unit 34 selects the main subject on the basis of the estimation result of the main subject degree map, and in a case where the reliability of the region of the reliability map corresponding to the region in which the main subject appears is high, and even in a case where the overall reliability is low, controls imaging on the basis of the Depth image so as to set the main subject as a focus target.

During learning of the reliability estimation model M2 in FIG. 12, an absolute value error for each pixel is calculated as a comparison result between the Depth image as an estimation result and the Depth correct answer data, and a reliability map of the correct answer is generated. The reliability estimation model M2 is learned using a pair of the RGB image and the correct answer reliability map as learning data.

As reliability information indicating the reliability of the estimation result of the Depth estimation model M1, various types of information indicating a degree of reliability can be used.

Note that the reliability estimation model M2 may be configured by not an estimation model using intermediate data as input but an estimation model using an RGB image as a direct input.

Usage Example of Depth Image

The estimation of the Depth image using the Depth estimation model M1 is performed on each frame of the image for preview as described above. Each frame continuously imaged is sequentially used for estimation of the Depth image. In a case where a frame period in which the reliability of the Depth image is lower than a threshold occurs, the Depth image estimated before the period having the reliability higher than the threshold may be used for the photographing control. For example, the latest Depth image having reliability higher than the threshold is used for imaging control.

The reliability that is an estimation result of the reliability estimation model M2 may be used for learning a scene that the Depth estimation model M1 is good at or a scene that the Depth estimation model M1 is not good at.

Although the Depth image is used for imaging control such as autofocus, the Depth image may be used for processing other than imaging control.

About Program

The series of processing described above can be executed by hardware or can be executed by software. In a case where the series of processing is executed by software, a program constituting the software is installed to a computer incorporated in dedicated hardware, a general-purpose personal computer, or the like.

The program to be installed is provided by being recorded in a removable medium 121 illustrated in FIG. 9, including an optical disc (compact disc-read only memory (CD-ROM), a digital versatile disc (DVD), and the like), a semiconductor memory, or the like. Furthermore, the program may be provided via a wired or wireless transmission medium such as a local area network, the Internet, or digital broadcasting. The program can be preinstalled in the ROM 112 or the storage unit 118.

The program executed by the computer may be a program in which the processing is performed in time series in the order described in the present description, or may be a program in which the processing is performed in parallel or at a necessary timing such as when a call is made.

In the present description, a system means a set of a plurality of components (devices, modules (parts), and the like), and it does not matter whether or not all the components are in the same housing. Therefore, a plurality of devices accommodated in separate housings and connected via a network and one device in which a plurality of modules is accommodated in one housing are both systems.

The effects described in the present description are merely examples and are not restrictive, and additionally, other effects may be provided.

An embodiment of the present technology is not limited to the above-described embodiment, and various modifications can be made without departing from the scope of the present technology.

For example, the present technology may have a configuration as cloud computing in which one function is shared and processed together by a plurality of devices via a network.

Furthermore, each step described in the flowchart described above may be executed by one device, or may be executed in a shared manner by a plurality of devices.

Moreover, in a case where a plurality of pieces of processing is included in one step, the plurality of pieces of processing included in the one step can be executed by one device or shared and executed by the plurality of the devices.

Examples of Combinations of Configurations

The present technology may also have the following configurations.

(1)

A control device including:

a first generation unit that generates Depth information indicating a distance to each position of a subject appearing in a captured image on the basis of output of a first estimation model when the captured image is input; and a second generation unit that generates reliability information indicating reliability of the Depth information on the basis of output of a second estimation model when intermediate data generated in the first estimation model is input at the time of estimation of the Depth information.

(2)

The control device according to (1), in which the first generation unit generates, as the Depth information, a Depth image having a distance to each position of the subject as a value of each pixel.

(3)

The control device according to (1) or (2), further including an imaging control unit that controls imaging by using the Depth information depending on the reliability.

(4)

The control device according to (3), in which the imaging control unit controls imaging by using the Depth information having the reliability higher than a threshold.

(5)

The control device according to (4), further including a phase difference detection unit that detects a phase difference, in which the imaging control unit controls the focus on the basis of the Depth information in a case where the reliability is higher than a threshold, and controls the focus on the basis of the phase difference detected by the phase difference detection unit in a case where the reliability is lower than the threshold.

(6)

The control device according to (5), in which the imaging control unit controls imaging by using the Depth information having the reliability higher than a threshold, the Depth information being generated before the Depth information having the reliability lower than the threshold.

(7)

The control device according to any one of (1) to (6), in which the first generation unit generates the Depth information on the basis of each of the captured images captured in a sequential manner, and the second generation unit generates the reliability information indicating the reliability of each piece of the Depth information generated on the basis of each of the captured images.

(8)

The control device according to any one of (1) to (7), in which the first estimation model is a model generated by learning using an image for learning and correct answer Depth information representing a correct answer distance to each position of a subject appearing in the image for learning, and the second estimation model is a model generated by learning using reliability of a correct answer of an estimation result of the first estimation model represented by a comparison result between the correct answer Depth information and the Depth information and the image for learning used as input of the first estimation model.

(9)

A control method, in which a control device generates Depth information indicating a distance to each position of a subject appearing in a captured image on the basis of output of a first estimation model when the captured image is input, and generates reliability information indicating reliability of the Depth information on the basis of output of a second estimation model when intermediate data generated in the first estimation model is input at the time of estimation of the Depth information.

(10)

A program causing a computer to execute pieces of processing of:

generating Depth information indicating a distance to each position of a subject appearing in a captured image on the basis of output of a first estimation model when the captured image is input, and generating reliability information indicating reliability of the Depth information on the basis of output of a second estimation model when intermediate data generated in the first estimation model is input at the time of estimation of the Depth information.

(11)

An information processing device including:

a first learning unit that performs learning using an image for learning and correct answer Depth information indicating a correct answer distance to each position of a subject appearing in the image for learning, and generates a first estimation model having a captured image as input and having, as output, Depth information indicating a distance to each position of the subject appearing in the captured image; and a second learning unit that performs learning using reliability of a correct answer of an estimation result of the first estimation model indicated by a comparison result between the correct answer Depth information and the Depth information and the image for learning used as input of the first estimation model, and generates a second estimation model having, as input, intermediate data generated in the first estimation model at the time of estimation of the Depth information and having the reliability as output.

(12)

The information processing device according to (11), further including a learning data generation unit that repeats generation of a pair of the reliability of the correct answer calculated on the basis of a comparison result between the correct answer Depth information and the Depth information and the image for learning as input of the first estimation model as learning data of the second estimation model on the basis of the plurality of images for learning and the correct answer Depth information.

(13)

A generation method, in which an information processing device performs:

learning using an image for learning and correct answer Depth information indicating a correct answer distance to each position of a subject appearing in the image for learning, and generates a first estimation model having a captured image as input and having, as output, Depth information indicating a distance to each position of the subject appearing in the captured image; and learning using reliability of a correct answer of an estimation result of the first estimation model indicated by a comparison result between the correct answer Depth information and the Depth information and the image for learning used as input of the first estimation model, and generates a second estimation model having, as input, intermediate data generated in the first estimation model at the time of estimation of the Depth information and having the reliability as output.

(14)

A program causing a computer to execute pieces of processing of:

learning using an image for learning and correct answer Depth information indicating a correct answer distance to each position of a subject appearing in the image for learning, and generating a first estimation model having a captured image as input and having, as output, Depth information indicating a distance to each position of the subject appearing in the captured image; and learning using reliability of a correct answer of an estimation result of the first estimation model indicated by a comparison result between the correct answer Depth information and the Depth information and the image for learning used as input of the first estimation model, and generating a second estimation model having, as input, intermediate data generated in the first estimation model at the time of estimation of the Depth information and having the reliability as output.

REFERENCE SIGNS LIST

1 Smartphone
11 Control unit
31 Depth image generation unit
32 Reliability generation unit
33 Phase difference detection unit
34 Imaging control unit
101 Information processing device
131 Learning unit
141 Depth estimation model learning unit
142 Reliability estimation model learning unit
151 Learning data generation unit
152 Model learning unit

The invention claimed is:

1. A control device comprising:

circuitry configured to generate Depth information indicating a distance to each position of a subject appearing in a captured image on a basis of output of a first estimation model when the captured image is input directly to the first estimation model;

generate reliability information indicating reliability of the Depth information on a basis of output of a second estimation model when intermediate data generated in the first estimation model is input to the second estimation model at the time of estimation of the Depth information;

detect a phase difference for the captured image;

determine whether the reliability of the Depth information is higher than a predetermined threshold;

determine a focus target based on whether the reliability of the Depth information is higher than the predetermined threshold or not; and perform focus control on the focus target based on whether the reliability of the Depth information is higher than the predetermined threshold or not, wherein the reliability information output by the second estimation model includes a reliability map having map information with a plurality of pixels associated with the captured image, wherein the circuitry determines the focus target and performs the focus control based on the Depth information in a case where the reliability of the Depth information is higher than the predetermined threshold and determines the focus target and performs the focus control based on the phase difference in a case where the reliability of the Depth information is lower than the predetermined threshold and without using the output of the first estimation model, wherein, in addition to the focus control, one or more of exposure control and/or white balance control are performed by the circuitry based on the Depth information in the case where the reliability of the Depth information is higher than the predetermined threshold, wherein the circuitry determines the focus target as an object appearing in a region of one or more of the plurality of pixels having reliability higher than the predetermined threshold in the case where the reliability of the Depth information is higher than the predetermined threshold, and wherein the circuitry controls imaging by using the Depth information having the reliability higher than the predetermined threshold, the Depth information being generated before the Depth information having the reliability lower than the predetermined threshold.

2. The control device according to claim 1, wherein the circuitry generates, as the Depth information, a Depth image having a distance to each position of the subject as a value of each pixel of the plurality of pixels associated with the captured image.

3. The control device according to claim 1, wherein the circuitry generates the Depth information on a basis of each of a plurality of captured images captured in a sequential manner, and the circuitry generates the reliability information indicating the reliability of each piece of the Depth information generated on a basis of each of the plurality of captured images.

4. The control device according to claim 1, wherein the first estimation model is a model generated by learning using an image for learning and correct answer Depth information representing a correct answer distance to each position of a subject appearing in the image for learning, the second estimation model is a model generated by learning using reliability of a correct answer of an estimation result of the first estimation model represented by a comparison result between the correct answer Depth information and the Depth information and the image for learning used as input of the first estimation model.

5. A control method, by a control device of a smartphone, comprising:

generating Depth information indicating a distance to each position of a subject appearing in a captured image on a basis of output of a first estimation model under a condition where the captured image is input to the first estimation model;

generating reliability information indicating reliability of the Depth information on a basis of output of a second estimation model under a condition where intermediate data generated in the first estimation model is input to the second estimation model at the time of estimation of the Depth information;

detecting a phase difference for the captured image;

determining whether the reliability of the Depth information is higher than a predetermined threshold;

determining a focus target based on whether the reliability of the Depth information is higher than the predetermined threshold or not; and performing focus control on the focus target based on whether the reliability of the Depth information is higher than the predetermined threshold or not, wherein the reliability information output by the second estimation model includes a reliability map having map information with a plurality of pixels associated with the captured image, wherein the focus target and the focus control are determined based on the Depth information in a case where the reliability of the Depth information is higher than the predetermined threshold and are determined based on the phase difference in a case where the reliability of the Depth information is lower than the predetermined threshold and without using the output of the first estimation model, wherein the focus target is determined as an object appearing in a region of one or more of the plurality of pixels having reliability higher than the predetermined threshold in the case where the reliability of the Depth information is higher than the predetermined threshold, and wherein the Depth information is generated before the Depth information having the reliability lower than the predetermined threshold.

6. The control method according to claim 5, wherein said generating generates, as the Depth information, a Depth image having a distance to each position of the subject as a value of each-said pixel of the plurality of pixels associated with the captured image.

7. The control method according to claim 5, wherein the Depth information is generated on a basis of each of a plurality of captured images captured in a sequential manner, and the generated reliability information indicates the reliability of each piece of the Depth information generated based on each of the plurality of captured images.

8. The control method according to claim 5, wherein the first estimation model is a model generated by learning using an image for learning and correct answer Depth information representing a correct answer distance to each position of a subject appearing in the image for learning, and the second estimation model is a model generated by learning using reliability of a correct answer of an estimation result of the first estimation model represented by a comparison result between the correct answer Depth information and the Depth information and the image for learning used as input of the first estimation model.

9. The control method according to claim 5, wherein in addition to the focus control, further comprising performing one or more of exposure control and/or white balance control based on the Depth information in the case where the reliability of the Depth information is higher than the predetermined threshold.

10. A non-transitory computer-readable storage medium having stored thereon instructions that, when executed by one or more processors, causes the one or more processors to perform a method comprising:

generating Depth information indicating a distance to each position of a subject appearing in a captured image on a basis of output of a first estimation model under a condition where the captured image is input to the first estimation model;

generating reliability information indicating reliability of the Depth information on a basis of output of a second estimation model under a condition where intermediate data generated in the first estimation model is input to the second estimation model at the time of estimation of the Depth information;

detecting a phase difference for the captured image;

determining whether the reliability of the Depth information is higher than a predetermined threshold;

determining a focus target based on whether the reliability of the Depth information is higher than the predetermined threshold or not ; and performing focus control on the focus target based on whether the reliability of the Depth information is higher than the predetermined threshold or not, wherein the reliability information output by the second estimation model includes a reliability map having map information with a plurality of pixels associated with the captured image, wherein the focus target and the focus control are determined based on the Depth information in a case where the reliability of the Depth information is higher than the predetermined threshold and are determined based on the phase difference in a case where the reliability of the Depth information is lower than the predetermined threshold and without using the output of the first estimation model, wherein the focus target is determined as an object appearing in a region of one or more of the plurality of pixels having reliability higher than the predetermined threshold in the case where the reliability of the Depth information is higher than the predetermined threshold, and wherein the Depth information is generated before the Depth information having the reliability lower than the predetermined threshold.

11. The non-transitory computer-readable storage medium according to claim 10, wherein said generating generates, as the Depth information, a Depth image having a distance to each position of the subject as a value of each pixel of the plurality of pixels associated with the captured image.

12. The non-transitory computer-readable storage medium according to claim 10, wherein the Depth information is generated on a basis of each of a plurality of captured images captured in a sequential manner, and the generated reliability information indicates the reliability of each piece of the Depth information generated based on each of the plurality of captured images.

13. The non-transitory computer-readable storage medium according to claim 10, wherein the first estimation model is a model generated by learning using an image for learning and correct answer Depth information representing a correct answer distance to each position of a subject appearing in the image for learning, and the second estimation model is a model generated by learning using reliability of a correct answer of an estimation result of the first estimation model represented by a comparison result between the correct answer Depth information and the Depth information and the image for learning used as input of the first estimation model.

14. The non-transitory computer-readable storage medium according to claim 10, wherein in addition to the focus control, further comprising performing one or more of exposure control and/or white balance control based on the Depth information in the case where the reliability of the Depth information is higher than the predetermined threshold.

* * * * *